Figure 1:
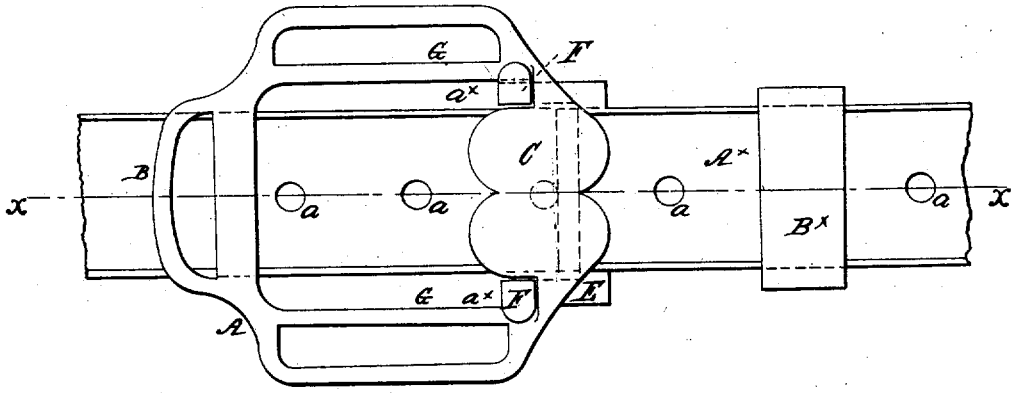

E. COLE.

Buckle.

No. 2,823. Reissued Dec. 31, 1867.

*Witnesses:*

C. A. Pettis

J. C. Kemon

*Inventor:*

Egra Cole by Munn & Co

Attorneys

N. PETERS, Photo-Lithographer, Washington, D. C.

United States Patent Office.

EZRA COLE, OF FAIRFIELD, MICHIGAN.

*Letters Patent No.* 69,181, *dated September* 24, 1867; *reissue No.* 2,823, *dated December* 31, 1867.

IMPROVED BUCKLE.

The Schedule referred to in these Letters Patent and making part of the same.

TO ALL WHOM IT MAY CONCERN:

Be it known that I, EZRA COLE, of Fairfield, in the county of Lenawee, and State of Michigan, have invented a new and useful Improvement in Buckles; and I do hereby declare that the following is a full, clear, and exact description thereof, which will enable others skilled in the art to make and use the same, reference being had to the accompanying drawings, forming part of this specification.

The present invention relates to a new and improved buckle for harness-tugs or traces.

In buckles for harness-tugs or traces, it is most essential that they should be so constructed as to secure the following results: first, a perfectly straight drawing of the tug; second, a drawing, both by the tongue and by the frame to the buckle, in so pinching the tug that the hole therein cannot bulge and tear out; third, releasing the pinching of the buckle and frame upon the tug when the drawing of the tug stops; and, fourth, an easy adjustment of the buckle-tongue from one hole to another in the tug.

By my improved buckle all of the above results are attained, and in a most satisfactory and perfect manner, as will be obvious from the following detail description of the same, in which—

Figure 1 is a plan or top view of a buckle made according to the present invention.

Figure 2:
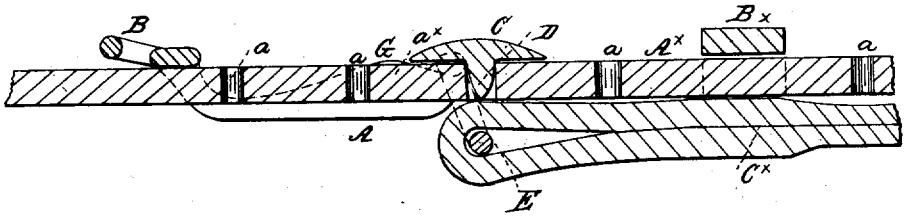

Figure 2, a central longitudinal section taken in the plane of the line *x x*, fig. 1.

Similar letters of reference indicate like parts.

A, in the drawings, represents the frame of the buckle. This buckle-frame A, at one end, has a loop, B, which receives the breeching-strap, and at the opposite end it has a plate, C, which is provided at its under side with a tongue-pin, D, by which the buckle is engaged with the trace or tug-strap A×, the latter being inserted forward under the loop B and plate C, and to and through the ordinary loop or loops B× of a hame-tug, C×, which, by end-pins F of a yoke or bail, E, of the hame-tug C×, is hung to and upon the side pieces G of the buckle, at the rounded portions *a*× of the same. The tongue D of the plate C is fitted in any one of a series of holes, *a*, made in the trace or tug-strap A×, and when the pin D is thus adjusted, it will be seen that any pull on the trace and hame-tug will serve to cause the trace and hame-tug to be pinched together, the yoke or bail E, which connects the hame-tug with the frame A of the buckle, serving as a lever to effect that result.

From the above description, and by an inspection of the drawings, it is plain to be seen and understood that all the points hereinbefore enumerated are secured, and in a most simple, cheap, and practical manner.

Having thus described my invention, I claim as new, and desire to secure by Letters Patent—

The buckle, constructed as described, consisting of the curved frame A, having at one end the plate C, provided with a downward projection or lug, D, in combination with the bail E, whose pins F rest and slide upon the upper edges of the curved frame A, as herein described, as and for the purpose specified.

EZRA COLE.

Witnesses:

WM. F. MCNAMARA,

CHAS. A. PETTIT.